(No Model.)
J. McCAFFREY.
SAFETY WATER GAGE.
No. 349,509. Patented Sept. 21, 1886.
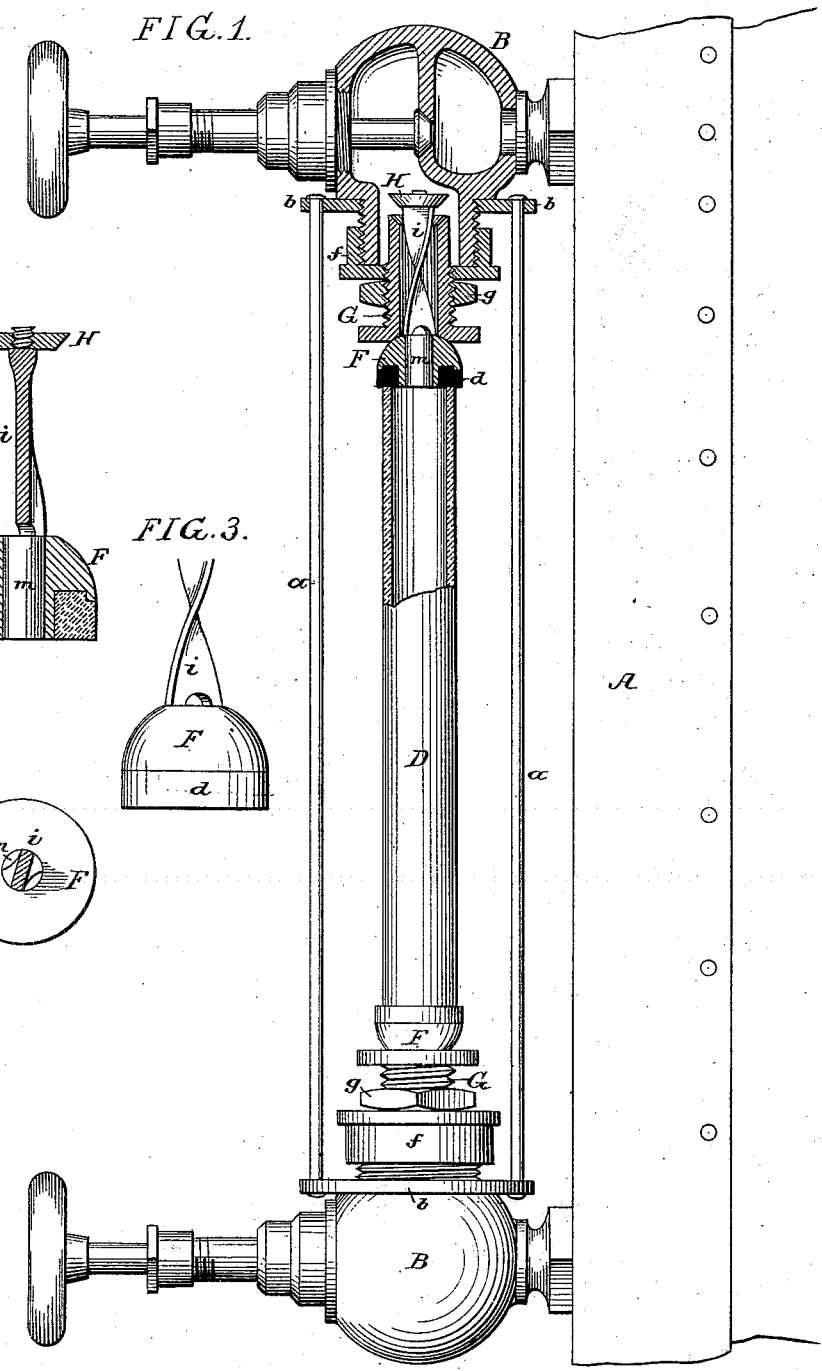
Witnesses:
William F. Davis
William D. Conver
Inventor:
James McCaffrey
by his Attorneys
Howson & Sons

UNITED STATES PATENT OFFICE.

JAMES McCAFFREY, OF PHILADELPHIA, PENNSYLVANIA, ASSIGNOR OF ONE-HALF TO JOHN FORREST, OF SAME PLACE.

SAFETY WATER-GAGE.

SPECIFICATION forming part of Letters Patent No. 349,509, dated September 21, 1886.

Application filed February 15, 1886. Serial No. 191,985. (No model.)

*To all whom it may concern:*

Be it known that I, JAMES McCAFFREY, a citizen of the United States, residing in Philadelphia, Pennsylvania, have invented certain Improvements in Safety Water-Gages, of which the following is a specification.

My invention relates to that class of safety water-gages which are provided with valves to close and prevent the escape of water or steam in the event of the breaking of the glass tube of the gage, the objects of my invention being to simplify the construction of a water-gage of this class, to present as little obstruction as possible to the flow of water or steam into or from the gage-tube, to prevent the accumulation of dirt on the valves or valve-seats, and to insure the proper closing of the safety-valves when the glass tube of the gage is broken.

In the accompanying drawings, Figure 1 is a side view, partly in section, of a safety water-gage, showing my improvements; Fig. 2, a vertical section of the duplex safety-valve for the gage; Fig. 3, a side view of part of the same; and Fig. 4, a sectional plan view of said valve on the line 1 2, Fig. 2.

A represents part of the shell of a steam-boiler, provided with valve-casings B B, between which is confined the glass tube D of the gage, said tube being protected by guard-rods $a$, attached to plates $b$ on the casings of the valves in the usual manner. The glass tube D is seated at each end against a packing-strip, $d$, carried by a tubular valve, F, which is adapted to a seat in the outer end of a tube, G, screwed into a gland, $f$, or other part of the valve-casing B, so as to be adjustable therein, the tube being retained in this position after adjustment by means of a lock-nut, $g$. The inner end of the tube G forms a seat for a valve, H, connected to the valve F by a twisted stem, $i$, which, preferably, is integral with the said valve F, the valve H having an internally-threaded opening for the reception of the threaded end of the stem, as shown in Fig. 2.

In applying the gage the glass tube D is inserted between the upper and lower valves, F F, and the tube G then adjusted until said valves are tightly seated in the ends of the tubes and the packing $d$ pressed firmly against the ends of the tube D. The length of the stem $i$ is such that the valves H are thereby held away from their seats, so as to permit a free passage of water or steam into or from the glass tube of the gage through the tube G and hollow valves F. If the glass tube D is broken, however, the support is removed from the valves F, and the valves H are at once forced to their seats, so as to prevent the escape of either steam or water through the tubes G.

By using a single stem, $i$, instead of a stem having three or more ribs, as usual, for connecting the valves F and H, I reduce the area of the passage through the tube G as little as possible, and by twisting said stem I impart a whirling motion to the steam or water passing through said tube, this having a tendency to keep the valves H and the seats at the inner ends of the tubes clean, and thus insure the proper closing of the tubes by said valves H when the glass tube D is broken.

By making the stem $i$ integral with the valve F and securing the valve H to said stem, opportunity is afforded for the formation of a central opening, $m$, of large area in the valve F, whereas if the reverse construction is adopted and the stem $i$ screwed into said valve F the formation of such an opening is prevented.

I claim as my invention—

1. The combination of the glass tube D and casing B of a water-gage with the tube G, having end valve-seats, the tubular valve F, bearing upon the end of the glass tube and adapted to the outer seat of the tube G, and the valve H, connected to said valve F, and adapted to the inner seat of said tube G, all substantially as specified.

2. The combination of the glass tube D and casing B of the water-gage, the valve F, bearing upon the end of the tube G, the valve H, connected to the said valve F, and the tube G, adjustable in the casing B, and having an outer seat for the valve F and an inner seat for the valve H, all substantially as specified.

3. The combination of the tubular valve F, a stem, *i*, forming part thereof, and a valve, H, detachably secured to the end of said stem, all substantially as specified.

4. The combination of the casing B and glass tube D of a water-gage, a tubular valve, F, a valve, H, connected thereto by a twisted stem, *i*, and a tube, G, having an outer seat for the valve F and an inner seat for the valve H, all substantially as specified.

In testimony whereof I have signed my name to this specification in the presence of two subscribing witnesses.

JAMES McCAFFREY.

Witnesses:
 WILLIAM F. DAVIS,
 HARRY SMITH.